United States Patent
Mathur et al.

(10) Patent No.: US 11,144,430 B2
(45) Date of Patent: Oct. 12, 2021

(54) SYSTEM AND METHOD FOR EVALUATING AND FACILITATING CUSTOMIZED GUIDELINES USING USABILITY CODE PATTERN ANALYSIS

(71) Applicant: International Institute of Information Technology, Hyderabad, Hyderabad (IN)

(72) Inventors: Neeraj Mathur, Hyderabad (IN); Sai Anirudh Karre, Hyderabad (IN); Y Raghu Babu Reddy, Hyderabad (IN)

(73) Assignee: International Institute of Information Technology, Hyderabad, Hyderabad (IN)

( * ) Notice: Subject to any disclaimer, the term of this patent is extended or adjusted under 35 U.S.C. 154(b) by 164 days.

(21) Appl. No.: 16/587,007

(22) Filed: Sep. 29, 2019

(65) Prior Publication Data
US 2020/0104235 A1    Apr. 2, 2020

(30) Foreign Application Priority Data
Sep. 29, 2018   (IN) .............................. 201841036947

(51) Int. Cl.
*G06F 9/44* (2018.01)
*G06F 11/36* (2006.01)
*G06F 8/53* (2018.01)

(52) U.S. Cl.
CPC ............ *G06F 11/3604* (2013.01); *G06F 8/53* (2013.01); *G06F 11/3684* (2013.01); *G06F 11/3688* (2013.01)

(58) Field of Classification Search
CPC .... G06F 8/53; G06F 11/3604; G06F 11/3684; G06F 11/3688
See application file for complete search history.

(56) References Cited

U.S. PATENT DOCUMENTS

| | | | |
|---|---|---|---|
| 2007/0168946 A1* | 7/2007 | Drissi | G06F 8/71 717/110 |
| 2017/0054760 A1* | 2/2017 | Barton | G06F 21/54 |
| 2018/0052696 A1* | 2/2018 | Riscutia | G06Q 10/00 |
| 2019/0349756 A1* | 11/2019 | Bang | G06F 21/577 |
| 2020/0028772 A1* | 1/2020 | Laslau | H04L 41/145 |

* cited by examiner

*Primary Examiner* — Chat C Do
*Assistant Examiner* — Lenin Paulino

(57) ABSTRACT

A system for evaluating and facilitating customized source code based on the usability guidelines using a usability code pattern analysis is provided. The system includes a decompile module, a guideline loader module, an inspection module, a validation module, a recommendation module, and one or more databases. The system obtains the input package from the user computing device to generate customized the usability code pattern for the input package by decompiling, inspecting and validating the input package against a validation case based on the usability guidelines. The input package layout files decompiled in XML and JAR file formats. The evaluation of the usability guideline is based on existing usability guidelines. The validation module validates the usability of the input package at each instance periodically using validation test cases.

12 Claims, 9 Drawing Sheets

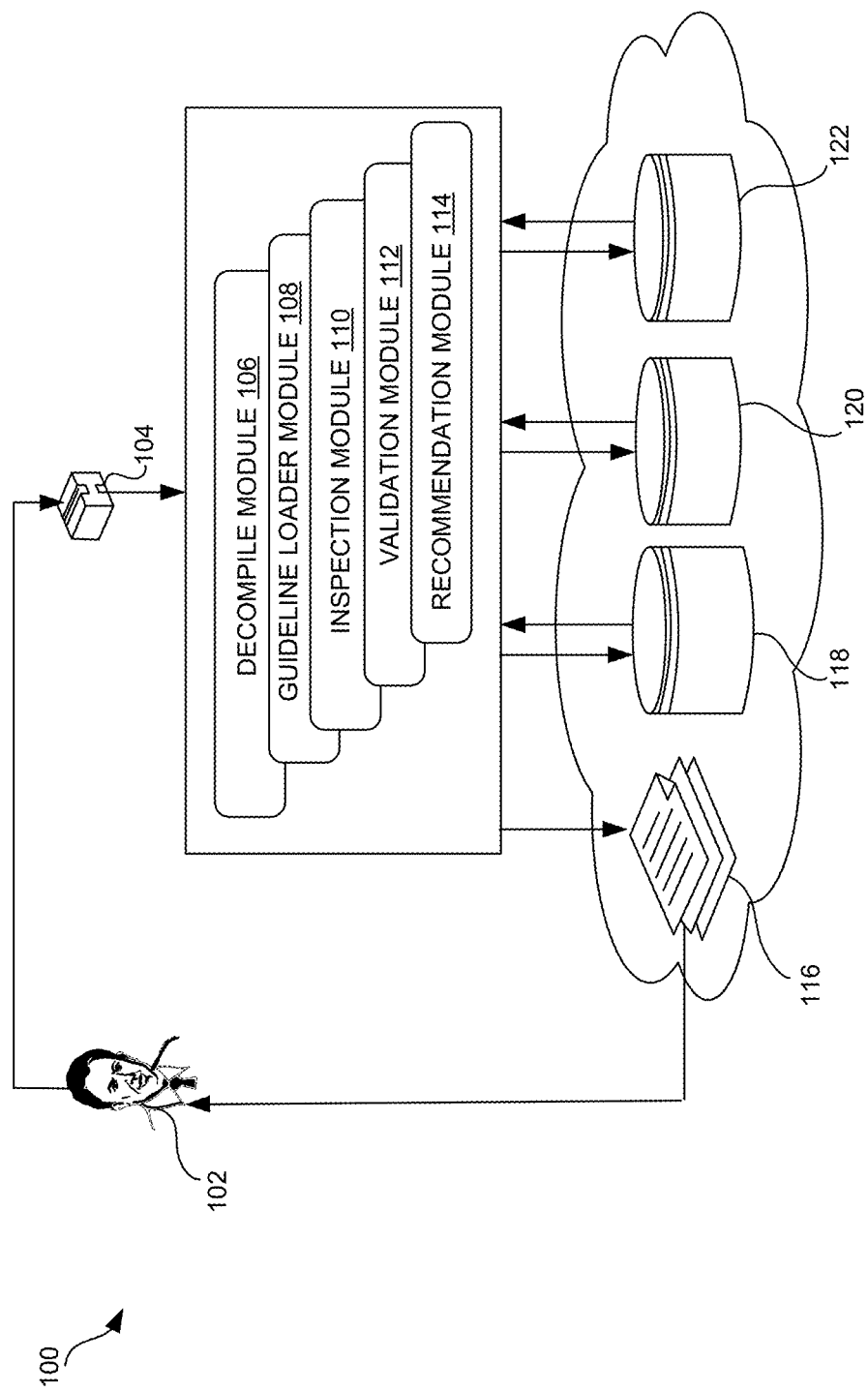

SYSTEM AND METHOD FOR EVALUATING AND FACILITATING CUSTOMIZED GUIDELINES USING USABILITY CODE PATTERN ANALYSIS

CROSS-REFERENCE TO PRIOR FILED PATENT APPLICATIONS

This application claims priority from the Indian provisional application no. 201841036947 filed on Sep. 29, 2018, which is herein incorporated by reference

BACKGROUND

Technical Field

The embodiments herein generally relate to evaluating and facilitating customized source code based on usability guidelines, and more particularly, to a system and method for evaluating and facilitating customized source code based on the usability guidelines using a usability code pattern analysis.

Description of the Related Art

Mobile applications are developed in different platforms for different operating system such as android, ios, windows, etc. Each operating system includes a different kind of guidelines in a different format based on an operating platform. A mobile application is developed to adapt to a user environment which is nothing but a computing device e.g. smartphones. The mobile application developers are needed to develop an application in a domain-specific to the user environment. Mostly, usability guidelines in the domain-specific mobile applications are unique and the domain-specific in implementation. Every mobile application developer is unclear during these kinds of implementations. It is difficult to validate and map these kinds of domain-specific guidelines.

The mobile application developers are transforming the usability problem into usability code pattern. They are many design patterns limited for User Interface (UI) design and they are considered as the usability code patterns. Generally, the usability code patterns are a template to the developers to create or alternate the usability guidelines. The usability guidelines are structured by using respective usability code patterns. The codes generally exist in the respective mobile application development toolkit. The usability code patterns are used to evaluate the usability guidelines to understand the level of automation required by the computing device.

Accordingly, there remains a need for a system and method for evaluating and facilitating customized source code based on the usability guidelines using a usability code pattern analysis.

SUMMARY

In view of the foregoing, an embodiment herein provides a for evaluating and facilitating customized usability source code based on the usability guidelines using a usability code pattern analysis is provided. The method includes the steps of (i) receiving an input package from a user device that the input package includes at least one of (a) layouts that represent data structure of the input package and (b) class files that are generated after compilation of the input package, (ii) decompiling the input package to extract an input package source code from at least one of the class files and the layouts of the input package, (iii) identifying usability guidelines that the input package requires to comply with based on a domain and a category of the input package from a rule database, (iv) generating a validation case using a validation case generator in a code format to compare against the input package source code based on the identified usability guidelines, (v) providing one or more constraints and one or more variables for the validation case during generation of validation case (vi) providing one or more constraints and one or more variables of the validation case in a sequence using a workflow invoker for executing validation of the input package source code against the validation case, (vii) executing the validation case against the input package source code based on a workflow by comparing the validation case against the input package source code and generating a validation result that includes (i) conformance results of the input package towards the validation case and (ii) evaluated usability guideline's (a) a number (b) a text (c) a description and (d) a category, and the validation result is stored in a metric database, and (viii) identifying a usability code pattern for the failed matches of the input package towards the usability guideline from a code snippet database, and (ix) recommending the usability code pattern to the user device to enable the user to customize the input package source code for the input package. In one embodiment, the rule database includes one or more usability guidelines. In one embodiment, the conformance results of the input package towards the validation case include at least one of (a) success matches if the usability guidelines match with the input package source code or (b) failed matches if the usability guidelines do not match with the input package source code.

In another embodiment, the method of generating the validation case includes the steps of (i) obtaining the input package from the user device, (ii) selecting the usability guidelines specified in a text format based on the user requirements and the domain and the category of the input package from the rule database, (iii) identifying the usability code pattern related to the usability guidelines and storing the usability code pattern related to the usability guidelines in a code snippet database, (iv) developing the validation case to the identified usability code pattern using the validation case generator, and (v) storing the validation case which contains a test case to evaluate the input package.

In yet another embodiment, the method of executing the validation case against the input package source code and generating the validation result includes the steps of (i) clearing any previous validated results of previous input packages, (ii) reading the layouts of the input package and selecting suitable attributes in properties section, (iii) comparing the usability code patterns of the usability guidelines that are stored in the code snippet database against the input package source code and providing the validation result (a) as one or more success matches, if the usability code patterns of the usability guidelines match with the input package source code (b) as one or more failed matches, if the usability code patterns of the usability guidelines does not match with the input package source code, (iv) suggesting suitable code patterns to the input package source code, if the validation result is at least one of the failed matches, and (v) providing the usability guidelines in detailed results, if the validation result is at least one of the success matches.

In yet another embodiment, the method of suggesting the suitable code patterns to the input package source code includes the steps of (i) indexing the one or more usability code patterns that are stored in the code snippet database by dividing the one or more usability code patterns into one or more terms of the one or more usability code patterns, (ii) storing one or more terms in an index file where each term is associated with the one or more usability code patterns that contain it, (iii) issuing a query of the text of the usability guidelines and processing to build an index and to lookup matching terms in the index, (iv) suggesting the suitable usability code patterns to the input package source code.

In some embodiments, the usability code patterns of the usability guidelines are obtained from android Software Development Kit (SDK) corresponding to Android, Windows mobile, iPhone operating System (IoS) mobile.

In yet another embodiment, the validation case generator includes (i) Toolbox usability controls defining module that is configured to provide controllers required to create the validation case for the usability guidelines (ii) Validation case workflow defining module that is configured to generate the validation workflow based on the controllers (iii) Arguments and Properties defining module, that is configured to define the plurality of input variables and the plurality of constraints as arguments to evaluate the validation case against input package source code.

In yet another embodiment, the validation case generator is implemented from a WorkFlow (WF) technology.

In yet another embodiment, the validation case is examined by one or more logical conditions to detect features of the input package source code based on a workflow of the input package source code.

In yet another embodiment, the decompiled layouts of the input package are in an eXtensible Markup Language (XML) file format and the decompiled class files of the input package are in a Java Archive (JAR) file format.

In one aspect, one or more non-transitory computer-readable storage medium storing the one or more sequence of instructions, which when executed by a processor, performs a method for evaluating and facilitating customized usability source code based on the usability guidelines using a usability code pattern analysis. The method includes the steps of (i) receiving an input package from a user device that the input package includes at least one of (a) layouts that represent data structure of the input package and (b) class files that are generated after compilation of the input package, (ii) decompiling the input package to extract an input package source code from at least one of the class files and the layouts of the input package, (iii) identifying usability guidelines that the input package requires to comply with based on a domain and a category of the input package from a rule database, (iv) generating a validation case using a validation case generator in a code format to compare against the input package source code based on the identified usability guidelines, (v) providing one or more constraints and one or more variables for the validation case during generation of validation case, (vi) providing one or more constraints and one or more variables of the validation case in a sequence using a workflow invoker for executing validation of the input package source code against the validation case, (vii) executing the validation case against the input package source code based on a workflow by comparing the validation case against the input package source code and generating a validation result that includes (i) conformance results of the input package towards the validation case and (ii) evaluated usability guideline's (a) a number (b) a text (c) a description and (d) a category, and the validation result is stored in a metric database, and (viii) identifying a usability code pattern for the failed matches of the input package towards the usability guideline from a code snippet database, and (ix) recommending the usability code pattern to the user device to enable the user to customize the input package source code for the input package. In one embodiment, the rule database includes one or more usability guidelines. In one embodiment, the conformance results of the input package towards the validation case include at least one of (a) success matches if the usability guidelines match with the input package source code or (b) failed matches if the usability guidelines do not match with the input package source code.

In one aspect, a system for evaluating and facilitating customized usability source code based on the usability guidelines using a usability code pattern analysis is provided. The system includes a device processor and a non-transitory computer readable storage medium storing one or more sequences of instructions, which when executed by the device processor, causes the steps of (i) receiving an input package from a user device that the input package includes at least one of (a) layouts that represent data structure of the input package and (b) class files that are generated after compilation of the input package, (ii) decompiling the input package to extract an input package source code from at least one of the class files and the layouts of the input package, (iii) identifying usability guidelines that the input package requires to comply with based on a domain and a category of the input package from a rule database, (iv) generating a validation case using a validation case generator in a code format to compare against the input package source code based on the identified usability guidelines, (v) providing one or more constraints and one or more variables for the validation case during generation of validation case, (vi) providing one or more constraints and one or more variables of the validation case in a sequence using a workflow invoker for executing validation of the input package source code against the validation case, (vii) executing the validation case against the input package source code based on a workflow by comparing the validation case against the input package source code and generating a validation result that includes (i) conformance results of the input package towards the validation case and (ii) evaluated usability guideline's (a) a number (b) a text (c) a description and (d) a category, and the validation result is stored in a metric database, and (viii) identifying a usability code pattern for the failed matches of the input package towards the usability guideline from a code snippet database, and (ix) recommending the usability code pattern to the user device to enable the user to customize the input package source code for the input package. In one embodiment, the rule database includes one or more usability guidelines. In one embodiment, the conformance results of the input package towards the validation case include at least one of (a) success matches if the usability guidelines match with the input package source code or (b) failed matches if the usability guidelines do not match with the input package source code.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which:

FIG. 1 is a schematic diagram of a usability guideline evaluation system 100 that illustrates an interaction between a user 102 and the usability guideline evaluation system 100 according to some embodiments herein;

DETAILED DESCRIPTION OF PREFERRED EMBODIMENTS

Figure 2A:
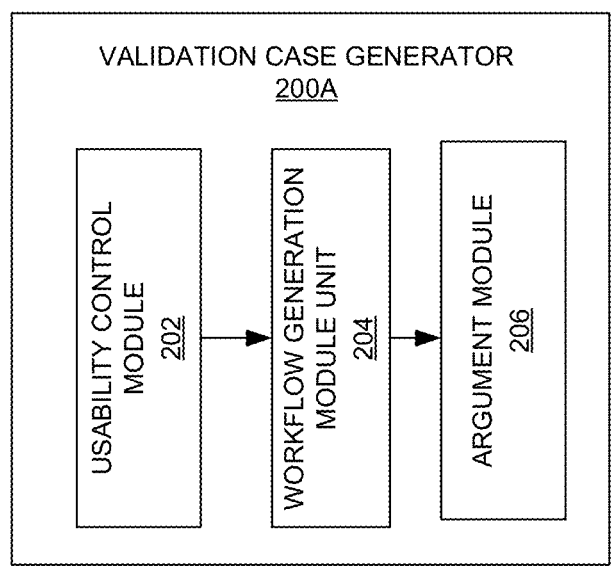
FIG. 2A illustrates a block diagram of a validation case generator 200A according to some embodiments herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned, there remains a need for a system and method for evaluating and facilitating customized source code based on the usability guidelines using a usability code pattern analysis. Referring now to the drawings, and more particularly to FIGS. 1 to 8, where similar reference characters denote corresponding features consistently throughout the figures, there are shown preferred embodiments.

FIG. 1 is a schematic diagram of a usability guideline evaluation system 100 that illustrates an interaction between a user and the usability guideline evaluation system 100 according to an embodiment herein. The usability guideline evaluation system 100 includes a decompile module 106, a guideline loader module 108, an inspection module 110, a validation module 112, a recommendation module 114, a metric database 118, a rule database 120 and a code snippet database 122.

The decompile module 106 loads an input package 104 that is obtained from one or more computing devices of a user 102. In some embodiments, the input package 104, without limitation, maybe a source code. In one embodiment, the source code in a format but not limited to Android Package (.APK), or IPA (IoS App Store Package). The input package 104 includes layouts and class files. In one embodiment, the layouts represent data structure of the input package 104. In one embodiment, the class files are java class files. The decompile module 106 decompiles the input package 104 to extract an input package source code from the layouts and class files of the input package 104. In some embodiments, the input package layout files may be decompiled into a format of Extensible Markup Language (XML) files. In some embodiments, the class files are decompiled to generate Java Archive (JAR) files by dex2jar tool. In one embodiment, the decompile module 106 extracts the source code artifacts includes but not limited to layout files, JAVA code files, manifest files. from of the input package 104. In one embodiment, the decompile module 106 uses APK tool to extract the input package layouts in XML format. In one embodiment, the decompile module 106 extracts the rest of the code in Java class files called .dex files by (i) converting the classes.dex files to JAR file using a dex2jar tool and extracting java class files from the generated JAR file. In one embodiment, the XML layout file and the Java Class files are used as an input for evaluation of the usability of the input package 104. In one embodiment, the input package 104 includes but not limited to a mobile application and a web application. In one embodiment, the usability guideline evaluation system 100 receives the input package 104 from the one or more computing devices of the user over a network. In one embodiment, the network is a wireless network or a wired network. In one embodiment, the usability guideline evaluation system 100 is a cloud service.

The guideline loader module 108 identifies usability guidelines that the input package 104 requires to comply with based on a domain and a category of the input package 104 and generates a validation case based on the identified usability guidelines that the validation case is a test case. In one embodiment, the usability guidelines may be selected by the user 102 based on the user requirements. In some embodiments, the usability guidelines for the input package 104 are stored in the rule database 120. In one embodiment, the rule database 120 stores one or more usability guidelines that are indexed based on the domain and category of the input package features. In one embodiment, the validation case is generated using a validation case generator.

The inspection module 110 extracts one or more constraints and one or more variables defined over the validation case to evaluate the validation test case against the input package source code. In some embodiments, the validation case is a test case that is structured using the identified usability guidelines. In some embodiments, the validation case is generated using the validation case generator in a code format to compare against the input package 104 source code based on the identified usability guidelines. The inspection module 110 detects features of the input package 104 based on one or more constraints and the one or more variables of the validation case in a sequence using a workflow invoker. The validation case is executed by sending the one or more constraints and one or more variables in sequence after loading the validation case using a workflow invoker and returns an evaluated output which is stored in the metric database 118. In some embodiments, the evaluated output is stored at each instance of execution. The validation module 112 validates usability of the input package 104 at each instance periodically using the validation test cases. In one embodiment, the validation module 112 loads the validation case using a workflow invoker where the one or more variables and the one or more constraints are passed in sequence. In some embodiments, by comparing the validation case against the input package 104 source code and generating a validation result 116 that includes (i) conformance results of the input package 104 towards the validation case and (ii) evaluated usability guideline's (a) a number (b) text (c) a description and (d) a category. In some embodiments, the conformance results of the input package 104 towards the validation case includes at least one of (i) success matches if the usability guidelines match with the input package source code or (ii) failed matches if the usability guidelines do not match with the input package source code.

The recommendation module 114 identifies usability code patterns for the usability guidelines while generating the validation cases. In some embodiments, the identified usability code patterns along with descriptions of the usability guideline are stored in the code snippet database 122 that is used for suggestion of usability code patterns during usability evaluation process. The usability code patterns are recommended to one or more computing devices of the user 102 to enable to customize the usability guidelines of the input package 104. In one embodiment, the recommendation module 114 uses the guideline description to match the usability code patterns that are stored in the code snippet database 122.

In some embodiments, the decompile module 106 is selected by the usability guideline evaluation system 100 based on an input package source format.

In some embodiments, the method of decompiling of input package 104 includes (i) converting the input package 104 in to machine code (ii) disassembling the machine code into an independent Intermediate representation (IR) (iii) translating the independent IR into at least one or more idiomatic sequences(iv) tracing the places at which register contents of the IR are defined and used by data flow analysis and generating high-level code for the IR in back end.

In some embodiments, the validation results 116 that is stored in the metric database 118 is transferred to an external system for visualization.

In some embodiments, the inspection module 110 extracts the one or more constraints and one or more variables of the input package 104 from decompiled input package layout files and the decompiled class files.

Figure 2B:
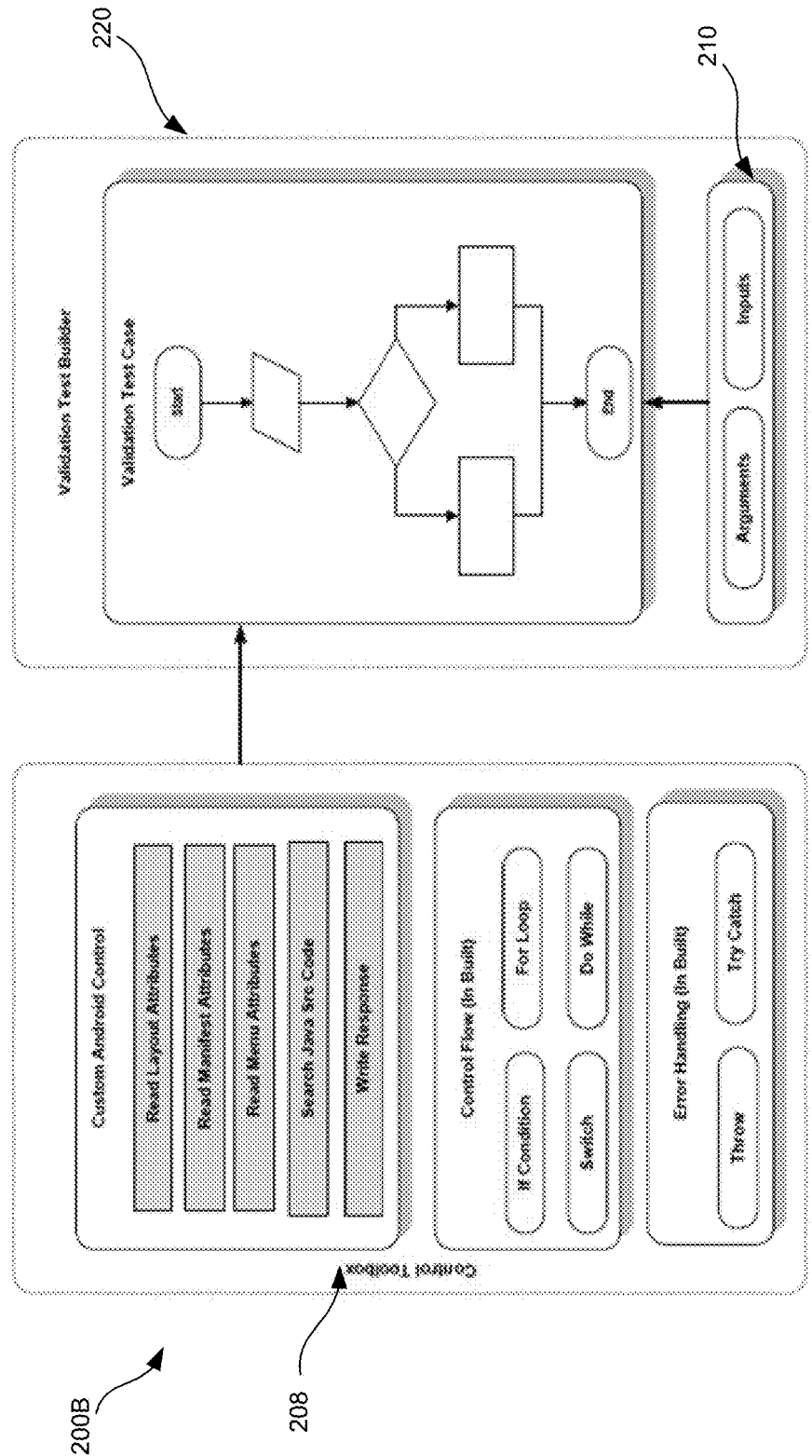
FIG. 2B is a schematic architecture of a validation case generator 200B according to some embodiments herein.

FIG. 2A illustrates a block diagram of a validation case generator 200A according to an embodiment herein. The validation case generator 200A generates a validation case to evaluate the usability guidelines against the input package 104 and to generate customized usability guidelines for input package 104. The validation case generator 200A includes a usability control module 202, a workflow generation module 204 and an argument module 206. The usability control module 202 provides a list of customized controls to generate the validation case. In some embodiments, the list of customized controls searches input package-specific source code for analysis. In one embodiment, the list of customized controls for the validation case specifically searches usability code pattern of the input package 104 for analysis. The workflow generation module 204 generates a workflow for the validation case based on the list of customized controls to validate the input package 104. In one embodiment, the workflow for the validation case is generated using drag and drop of the validation case generator 200 A based on the list of customized controls. The argument module 206 provides the one or more variables and one or more constraints as an argument to evaluate the validation case against the input package source code. In some embodiments, the argument format is customized based on the controls. FIG. 2B is a schematic architecture of a validation case generator 200B according to some embodiments herein. The validation case generator 200B includes a control toolbox 208, an argument provider 210 and a validation test builder 220. The control toolbox 208 provides custom controls, control flow and error handlers to the validation test builder 210 for the generation of a validation case. The argument provider 210 provides arguments to the validation test builder 210 for the generation of the validation case. The validation test builder 210 generates the validation case based on the custom controls, the control flow, the error handlers, and the arguments. In one embodiment, the custom controls include but not limited to (i) read layout attributes (ii) read manifest attributes (iii) read menu attributes (iv) search java src code and (v) write response. In one embodiment, the control flow includes but not limited to (i) If condition (ii) For Loop (iii) Switch and (iv) Do while. In one embodiment, the arguments include one or more constraints and one or more variables for validation case.

In some embodiments, the method of executing the validation case against the input package 104 includes (i) clearing any available previous validation case results, (ii) reading all available layout files and selecting suitable attributes in properties section and returns a value to the attribute in a variable to capture response for validation, (iii) a condition checker (for example If/Else, If, Switch, for, Do/While) is used as a part of condition check to run against the input package 104 to generate the response, (iv) success or failure responses are posted based on the response generated.

In some embodiments, the usability control module 202 provides controls to search source code in the layout file (eg. activity in Android), and search class file (eg. "Search Java Src Code") to detect any source code in the java source files. In one embodiment, the usability control module 202 provides the controls to search other artifacts of the source code and loads the input package 104 related attributes. In one embodiment, the usability Control module 202 provides conditions and error handlers. In some embodiments, the validation case generator 200A and 200B is implemented from WorkFlow (WF) technology. This technology provides rich functionality of existing controls and the ability to add custom code activity.

Figure 3:
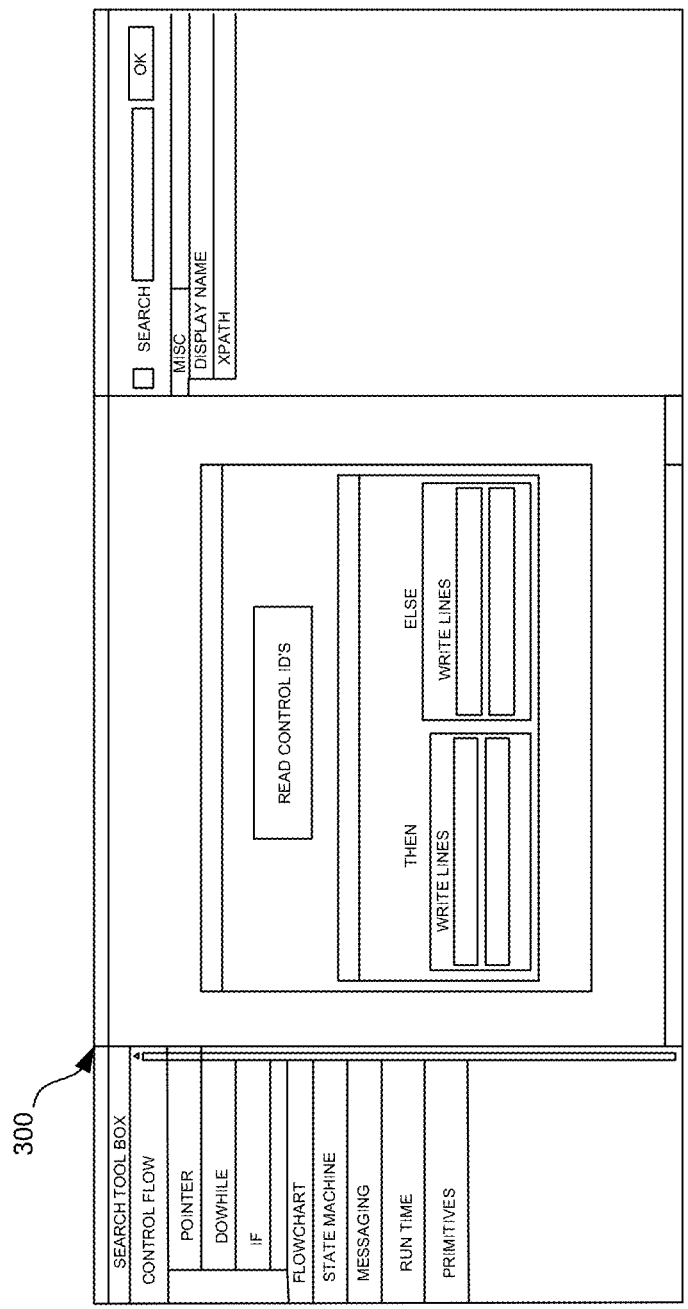
FIG. 3 illustrates a user interface view of the validation case generator 200A and 200B of FIGS. 2A and 2B according to some embodiments herein.

FIG. 3 illustrates a user interface view 300 of the validation case generator 200A and 200B of FIGS. 2A and 2B according to an embodiment herein. The validation case generator 200A and 200B generates a validation case based on selected the usability guidelines to evaluate the input package 104. The function of the validation case generator 200A and 200B is explained in detail in FIG. 2A and FIG. 2B.

Figure 4:
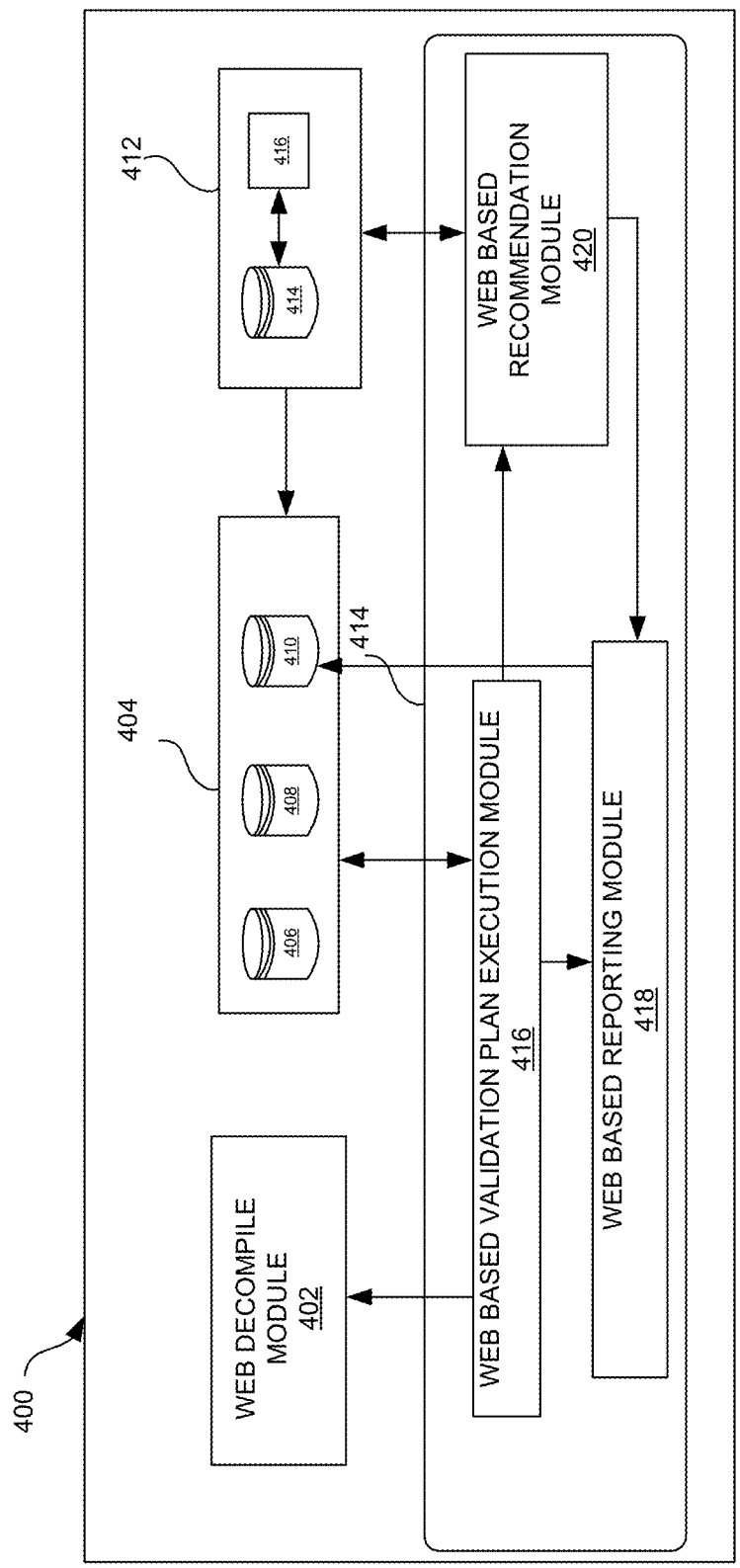
FIG. 4 illustrates an architecture of a web-based usability guideline evaluation system 400 according to some embodiments herein.

FIG. 4 illustrates an architecture of a web-based usability guideline evaluation system 400 according to an embodiment herein. The web usability guideline evaluation system 400 includes a web decompile module 402, a database storage module 404, a usability code search engine 412, and a web-based inspection module 414. The database storage module 404 includes a validation plan database 406, a validation test case database 408 and a metric database 410. The web-based inspection module 414 includes a web-based validation plan execution module 416, a web-based reporting module 418 and a web-based recommendation module 420. The validation plan database 406 stores validation plan with the usability guidelines and its associated validation cases. The validation test case database 408 stores and maintains validation cases generated by the validation case generator. The metric database 410 stores evaluation results and reports for future analysis. The web decompile module 402 converts (i) the input package layout in the XML file format and (ii) an input package class in the JAR file format from the DEX format for evaluating the input package 104. The web-based inspection module 414 executes the validation plan using the validation plan execution module 416 against the input package 104 and generates validation results based presence or absence of the usability guidelines. In one embodiment, the validation results include a Guideline Number, a Guideline details including a Guideline text and its description along with the usability category. In one embodiment, if the usability guideline fails to identify the usability code pattern, it returns 1 Failed Matches as the response. In one embodiment, if the validation case is successful, it returns 1 Success Matches and provides success rate in percentage. The success rate percentage is an aggregate value of all the validation cases executed in once instance. The recommendation module 420 invokes the usability code search engine 412 that uses a code snippet search engine 416 to index the usability code patterns in a web-based usability code snippet database 414 and provides matching usability code patterns for the usability guidelines that are not matched for the input package 104. The web-based reporting module 418 represents the validation results along with recommendations from the web-based recommendation module 420. The.

In some embodiments, the web-based usability code snippet database 414 has large storage such that it may be used as a code bank. This helps to assess the quality of the input package 104.

In some exemplary embodiments, various input packages evaluated by the usability guideline evaluation system 100 of FIG. 1 are shown in below table.

| App Name | Version | Physical Lines of Code | Executable Lines of Code | Passed guideline | Failed guideline | % Success rate |
|---|---|---|---|---|---|---|
| Writing | | | | | | |
| Notes | 1.0.1 | 10388 | 9751 | 15 | 9 | 62.50 |
| To-Do list | 1.0.1 | 5711 | 5349 | 12 | 11 | 52.17 |
| Omni Notes | 5.3.2 | 117868 | 101868 | 13 | 12 | 52.00 |
| Memento | 1.1.0 | 12788 | 11831 | 16 | 9 | 64.00 |
| Cloud Notes | 0.11.0 | 59038 | 49326 | 10 | 10 | 50.00 |
| Snotepad | 1.2.1 | 6004 | 5712 | 11 | 11 | 50.00 |
| SyncOrg | 2.0.5.3 | 130466 | 100538 | 14 | 12 | 53.85 |
| Kolab Notes | 2.7.2 | 97644 | 68935 | 11 | 13 | 45.83 |
| JustNotes | 1.9 | 3112 | 2944 | 10 | 10 | 50.00 |
| NoteBuddy | 1.2.2 | 2950 | 2582 | 13 | 9 | 59.09 |
| Reading | | | | | | |
| Mi Manga Nu | 1.65 | 77839 | 68389 | 16 | 10 | 61.54 |
| spars | 1.11.8 | 21548 | 16733 | 13 | 9 | 59.09 |
| FBReader | 2.1 | 70522 | 56746 | 14 | 9 | 60.87 |
| Anecdote | 1.1.5 | 90553 | 77130 | 10 | 11 | 47.62 |
| Prayer Times | 3.6.3 | 262209 | 226981 | 12 | 15 | 44.44 |
| Open Manga | 3.2 | 60480 | 51211 | 11 | 10 | 52.38 |
| SurvivalManual | 3.9 | 81195 | 73087 | 9 | 10 | 47.37 |
| DocumentViewer | 2.7.9 | 96845 | 81764 | 12 | 13 | 48.00 |
| Quoter | 1.0.1 | 3638 | 3170 | 12 | 7 | 63.16 |
| Library | 5.1 | 4538 | 4214 | 11 | 8 | 57.89 |
| MuPDF | 1.10 | 5725 | 5070 | 11 | 9 | 55.00 |
| Money | | | | | | |
| My Expense | 2.7.9 | 261626 | 224685 | 24 | 9 | 72.73 |
| Lunary | 1.28 | 444253 | 391765 | 17 | 8 | 68.00 |
| Budget Watch | 0.13 | 99156 | 85204 | 11 | 10 | 52.38 |
| Loyalty Card | 0.11 | 138497 | 120541 | 11 | 10 | 52.38 |
| SmartcoinsWallet | 1.0.6 | 369971 | 319496 | 15 | 12 | 55.56 |
| TREZORManager | 1.0.5 | 155902 | 118819 | 15 | 8 | 65.22 |
| WALLETH | 0.16 | 175603 | 154777 | 11 | 9 | 55.00 |
| Bitcoin | 1.074 | 251874 | 202688 | 14 | 10 | 58.33 |
| Rental Calc | 0.4 | 137121 | 117961 | 11 | 12 | 47.83 |
| Gift CardGuard | 0.4 | 148842 | 130847 | 11 | 9 | 55.00 |
| General | | | | | | |
| Frrogal | 3.1.0 | 412799 | 325970 | 34 | 11 | 75.56 |
| Vlab | 0.4 | 262076 | 215687 | 25 | 4 | 86.21 |
| Wikipedia | 2.5.195 | 236951 | 202568 | 24 | 9 | 72.73 |
| BlitzMail | 0.6.1 | 51463 | 36013 | 9 | 11 | 45.00 |
| aMetro | 2.0.1.5 | 104815 | 93839 | 10 | 13 | 43.48 |
| DeltaChat | 0.9.2 | 154207 | 134179 | 10 | 9 | 52.63 |
| YaXim | 0.9.2 | 88771 | 75527 | 17 | 9 | 65.38 |
| Slim Twitter | 3.2 | 936 | 852 | 11 | 7 | 61.11 |
| SmartCoinWallet | 1.0.6 | 369971 | 319496 | 15 | 12 | 55.56 |
| Beem | 0.1.7 | 96544 | 77736 | 14 | 12 | 53.85 |
| FaceSlim | 3.1.0 | 21832 | 17325 | 11 | 7 | 61.11 |
| Telegram | 3.18.0 | 503106 | 422183 | 10 | 9 | 52.63 |
| PrePay | 0.17 | 44798 | 36211 | 11 | 9 | 55.00 |

Figure 5:
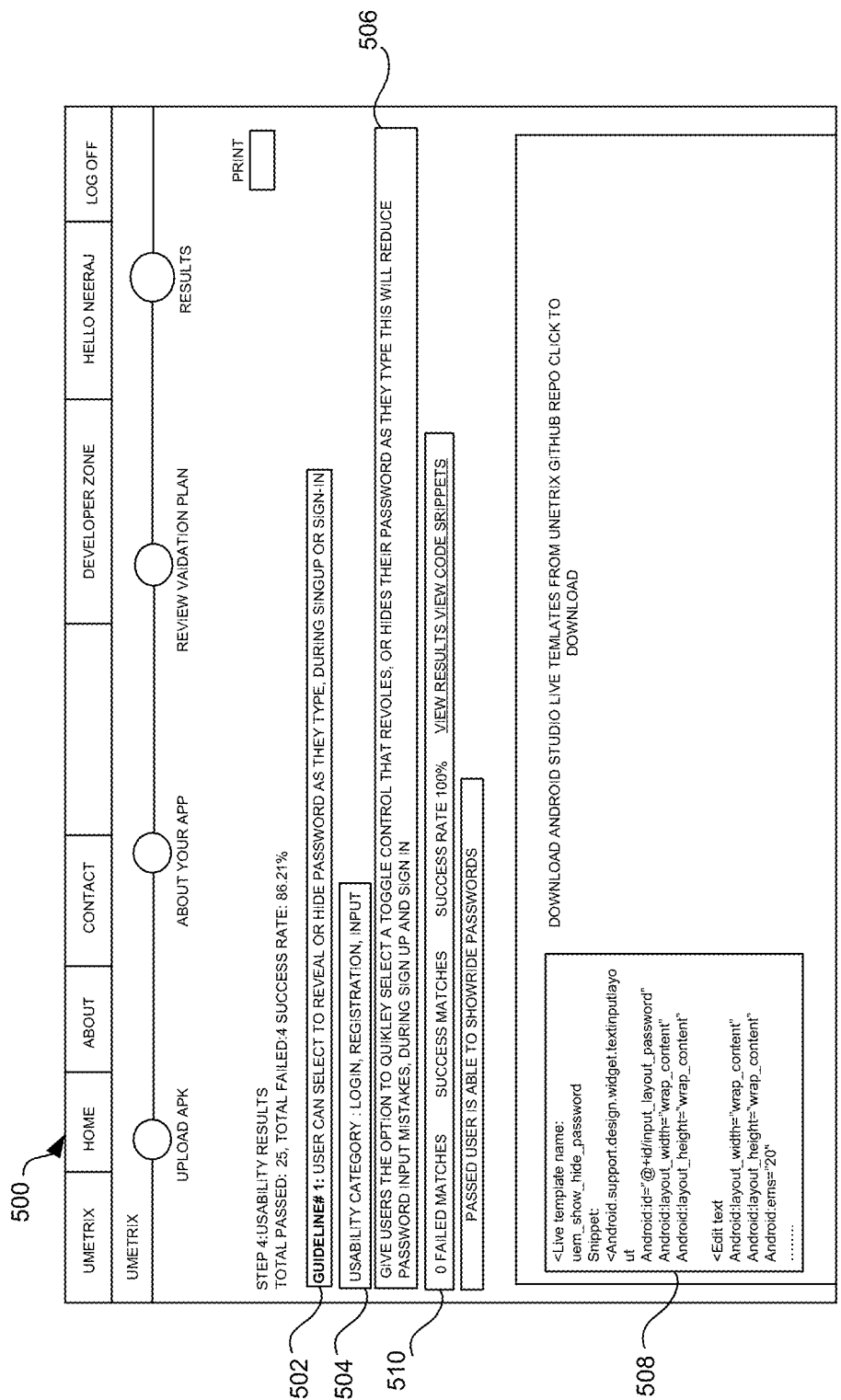
FIG. 5 illustrates a user interface view of the web-based usability guideline evaluation system 400 of FIG. 4 according to some embodiments herein.

FIG. 5 illustrates a user interface view of the web-based usability guideline evaluation system 400 of FIG. 4 according to an embodiment herein. The user interface view 500 depicts a result page of the evaluation result of the input package 104. In some embodiments, the result page contains a validation category 504 that shows the workflow instance of the input package 104. In some embodiments, description 506 explains the usability guidelines of the input package 104. In some embodiments, a guideline text 502 with a guideline number that explains about guidance to perform the action using input package 104. In some embodiments, a code snippet 508 that suggests the usability code patterns for the usability guidelines that are violated by the input package 104.

In some embodiments, a response 510 that includes (i) if the usability guideline fails to identify the code pattern, it shows 1 Failed match, (ii) if the validation case is successful, it returns 1 Success Matches, (iii) providing Success Rate in percentage. This success rate percentage is obtained by an aggregate value of all the validation cases executed in one instance.

Figure 6:
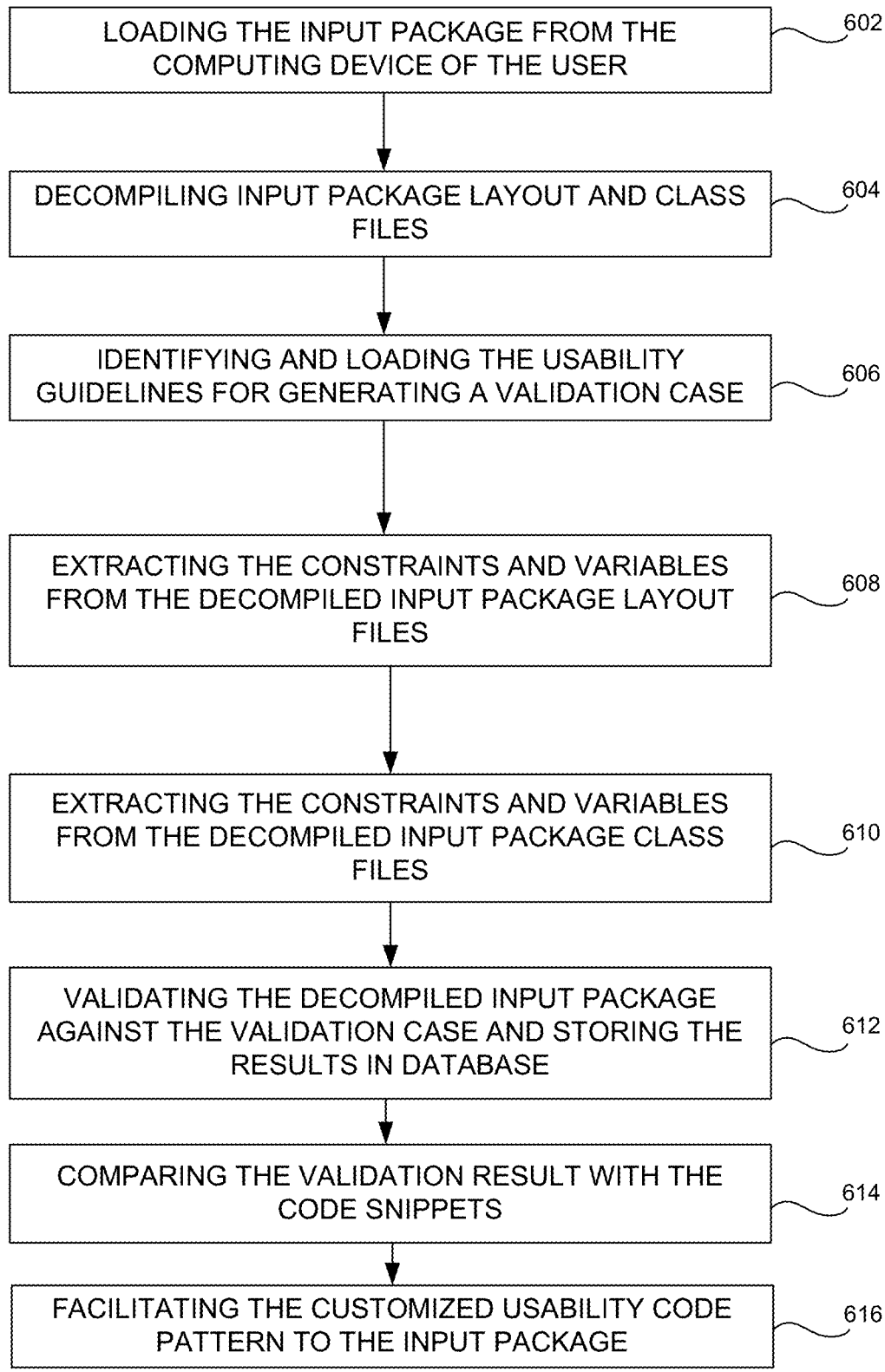
FIG. 6 is a flow diagram that illustrates a method for evaluating and facilitating customized usability guidelines using a usability code pattern analysis according to some embodiments herein.

FIG. 6 is a flow diagram that illustrates a method for evaluating and facilitating customized source code based on the usability guidelines using a usability code pattern analysis according to an embodiment herein. At step 602, an input package 104 from one or more computing device of a user 102 is loaded to a usability evaluation system 100. In one embodiment, the input package includes at least one of (i) layouts that represent data structure of the input package and (ii) class files that are generated after compilation of the input package. At step 604, the input package layouts and input package classes are decompiled in XML format and JAR format files respectively by the usability evaluation system 100. At step 606, the existing usability guidelines that the input package 104 requires to comply with are identified and loaded by the usability evaluation system 100 to generate a validation case. At step 608, the decompiled input layouts are inspected by the usability guideline system 100 that extracts the variables and constraints. At step 610, the decompiled input class files are inspected by the usability guideline system 100 that extracts the variables and constraints. At step 612, the decompiled input package files with usability code patterns are validated against the validation case using the usability guideline evaluation system 100 and the results are stored in the metric database 118. At step 614, the validation results are compared with code snippets which are stored in the code snippet database 122 using the recommendation module 114 and a suggestion of usability code patterns for the usability guidelines that are violated by the input package 104, is provided. At step 616, the customized usability code pattern to the user is facilitated using the usability evaluation system 100.

Figure 7:
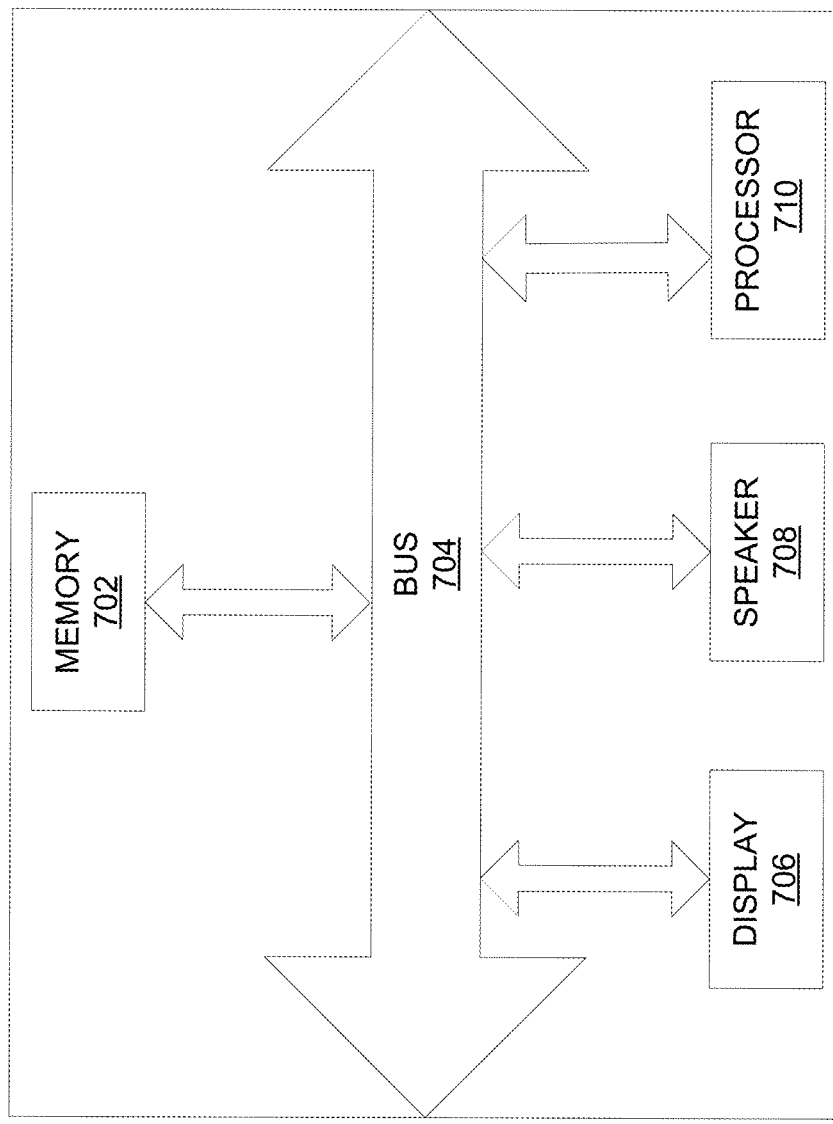
FIG. 7 illustrates an exploded view of a computing device according to some embodiments herein.

FIG. 7 illustrates an exploded view of the computing device/usability guideline evaluation server of the system 100 of FIG. 1 according to the embodiments herein. The computing device having a memory 702 having a set of computer instructions, a bus 704, a display 706, a speaker 708, and a processor 710 capable of processing a set of instructions to perform any one or more of the methodologies herein, according to an embodiment herein. The processor 710 may also enable digital content to be consumed in the form of a video for output via one or more displays 706 or audio for output via speaker and/or earphones 708. The processor 710 may also carry out the methods described herein and in accordance with the embodiments herein.

The embodiments herein can take the form of, an entire hardware embodiment, an entire software embodiment or an embodiment including both hardware and software elements. The embodiments that are implemented in software include but are not limited to, firmware, resident software, microcode, etc. Furthermore, the embodiments herein can take the form of a computer program product accessible from a computer-usable or computer-readable medium providing program code for use by or in connection with a computer or any instruction execution system. For the purposes of this description, a computer-usable or computer-readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read-only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, remote controls, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem, and Ethernet cards are just a few of the currently available types of network adapters.

Figure 8:
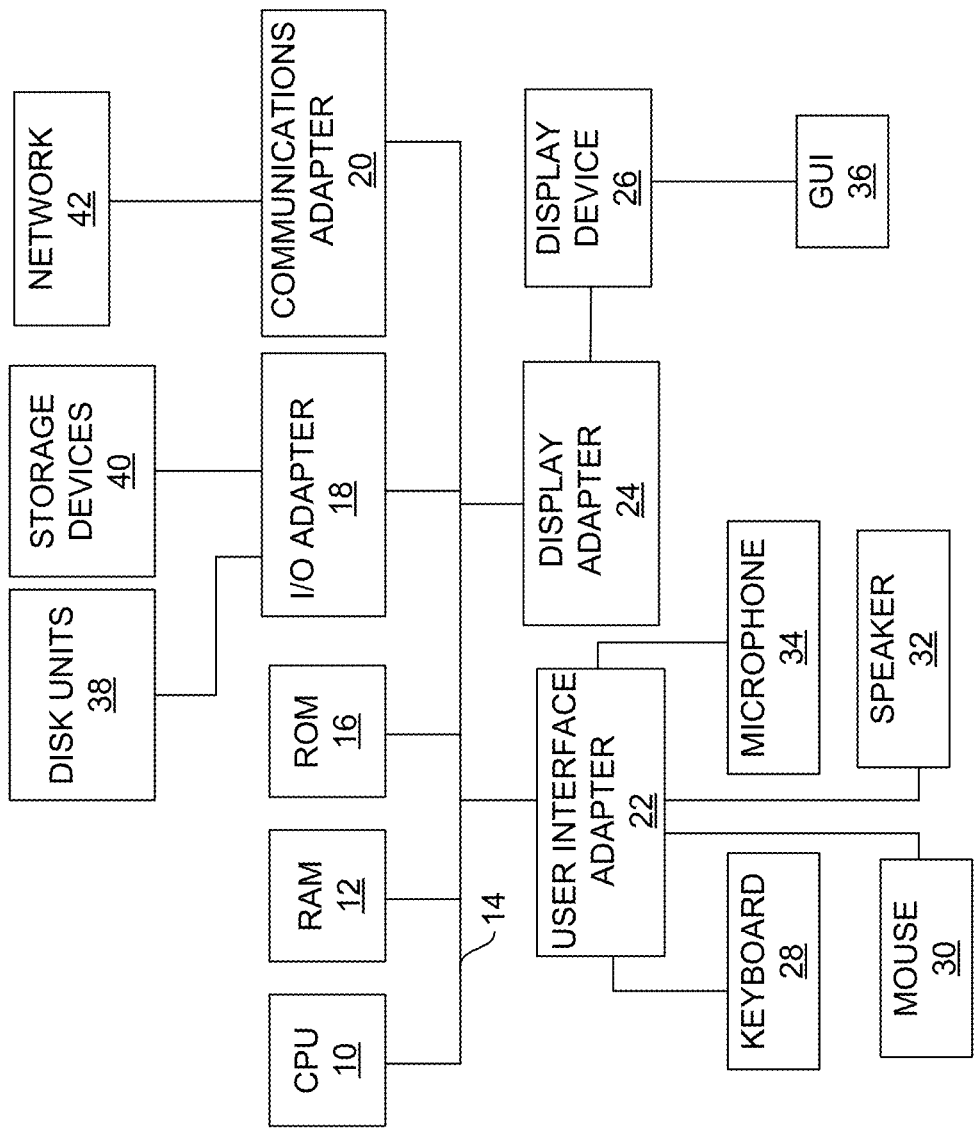
FIG. 8 is a schematic diagram of a computer architecture in accordance with the embodiments herein.

A representative hardware environment for practicing the embodiments herein is depicted in FIG. 8, with reference to FIGS. 1 through 7. This schematic drawing illustrates a hardware configuration of a server/computer system/computing device in accordance with the embodiments herein. The system includes at least one processing device CPU 10 that may be interconnected via system bus 14 to various devices such as a random access memory (RAM) 12, read-only memory (ROM) 16, and an input/output (I/O) adapter 18. The I/O adapter 18 can connect to peripheral devices, such as disk units 38 and program storage devices 40 that are readable by the system. The system can read the inventive instructions on the program storage devices 40 and follow these instructions to execute the methodology of the embodiments herein. The system further includes a user interface adapter 22 that connects a keyboard 28, mouse 30, speaker 32, microphone 34, and/or other user interface devices such as a touch screen device (not shown) to the bus 14 to gather user input. Additionally, a communication adapter 20 connects the bus 14 to a data processing network 42, and a display adapter 24 connects the bus 14 to a display device 26, which provides a graphical user interface (GUI) 36 of the output data in accordance with the embodiments herein, or which may be embodied as an output device such as a monitor, printer, or transmitter, for example.

In an embodiment, the existing usability guidelines are identified and loaded based on the input package usage in the computing device. The existing usability guidelines are considered as usability guideline rules to generate a customized usability guideline.

The system for customizing usability guidelines based on usability code pattern analysis is adapted with any independent users or organizations computing device. The system is used to customize the usability guideline is easy to diagnose. The system handles all formats of the input package of the user computing device at any size. The framework is extensible in nature and organizations can build their own set of validation test cases for a guideline. The validation cases designed to evaluate the usability guidelines can be stored and re-used for multiple mobile apps. At any given time, a guideline can be added, removed or modified for the overall evaluation. It is not required to rebuild the validation case for a given guideline every time we perform the evaluation. This essentially implies that a non-programmer can add or remove the guidelines to perform the overall validation by just choosing the guideline from guideline repository.

The system and method as disclosed in embodiments herein enable user/software developer/software tester to evaluate the software application before its release or launch based on the usability guidelines using the usability code pattern analysis. The system and method as disclosed reduces release cycle period for the software applications and enable the user to customize the software application before its launch.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope.

What is claimed is:

1. A processor-implemented method for evaluating and facilitating customized usability source code based on the usability guidelines using a usability code pattern analysis, said method comprising:

receiving an input package from a user device, wherein said input package comprises at least one of (i) layouts that represent data structure of the input package and (ii) class files that are generated after compilation of the input package;

decompiling the input package to extract an input package source code from at least one of the class files and the layouts of the input package;

identifying usability guidelines that the input package requires to comply with based on a domain and a category of the input package from a rule database, wherein the rule database comprises a plurality of usability guidelines;

generating a validation case using a validation case generator in a code format to compare against the input package source code based on the identified usability guidelines;

providing a plurality of constraints and a plurality of variables for the validation case during the generation of the validation case;

providing the plurality of constraints and the plurality of variables of the validation case in a sequence using a workflow invoker for executing validation of the input package source code against the validation case;

executing the validation case against the input package source code based on a workflow by comparing the validation case against the input package source code and generating a validation result by
 (a) clearing any previous validated results of previous input packages,
 (b) reading the layouts of the input package and selecting suitable attributes in properties section,
 (c) comparing the usability code patterns of the usability guidelines that are stored in the code snippet database against the input package source code and providing the validation result (i) as a plurality of success matches, if the usability code patterns of the usability guidelines match with the input package source code (ii) as a plurality of failed matches, if the usability code patterns of the usability guidelines does not match with the input package source code,
 (d) suggesting suitable usability code patterns to the input package source code, if the validation result is at least one of the failed matches; and
 (e) providing the usability guidelines in detailed results, if the validation result is at least one of the success matches,
 wherein the validation result comprises (i) conformance results of the input package towards the validation case and (ii) evaluated usability guideline's (a) a number (b) a text (c) a description and (d) a category, wherein the validation result is stored in a metric database, wherein the conformance results of the input package towards the validation case comprises at least one of (i) success matches if the usability guidelines match with the input package source code or (ii) failed matches if the usability guidelines does not match with the input package source code;

identifying a usability code pattern for the failed matches of the input package towards the usability guidelines from a code snippet database, wherein the code snippet database comprises a plurality of usability code patterns for the plurality of usability guidelines; and recommending the usability code pattern to the user device to enable a user to customize the input package source code for the input package.

2. The processor-implemented method of claim 1, wherein the method of generating the validation case comprises, obtaining the input package from the user device;

selecting the usability guidelines specified in a text format based on the user requirements and the domain and the category of the input package from the rule database;

identifying the usability code pattern related to the usability guidelines and storing the usability code pattern related to the usability guidelines in a code snippet database;

developing the validation case to the identified usability code pattern using the validation case generator; and storing the validation case which contains a test case to evaluate the input package.

3. The processor-implemented method of claim 1, wherein the method of suggesting the suitable code patterns to the input package source code comprises, indexing the plurality of usability code patterns that are stored in the code snippet database by dividing the plurality of usability code patterns into a plurality of terms of the plurality of usability code patterns;
storing the plurality of terms in an index file where each term is associated with the plurality of usability code patterns that contain it;
issuing a query of the text of the usability guidelines and processing to build an index and to lookup matching terms in the index; and
suggesting the suitable usability code patterns to the input package source code.

4. The processor-implemented method of claim 1, wherein the usability code patterns of the usability guidelines are obtained from Software Development Kit (SDK) corresponding to Android, Windows mobile, iPhone operating System (IoS) mobile.

5. The processor-implemented method of claim 1, wherein the validation case generator comprises (i) a usability control module that is configured to provide controls required to create the validation case based on the usability guidelines (ii) a workflow generation module that is configured to generate validation workflow based on the controls and (iii) an argument module, that is configured to define the plurality of input variables and the plurality of constraints as arguments to evaluate the validation case against the input package source code.

6. The processor-implemented method of claim 1, wherein the validation case generator is implemented from a WorkFlow (WF) technology.

7. The processor-implemented method of claim 1, wherein the validation case is examined by a plurality of logical conditions to detect features of the input package source code based on the workflow of the input package source code.

8. The processor-implemented method of claim 1, wherein the decompiled layouts of the input package are in an eXtensible Markup Language (XML) file format and the decompiled class files of the input package are in a Java Archive (JAR) file format.

9. One or more non-transitory computer-readable storage medium storing the one or more sequence of instructions for evaluating and facilitating customized usability source code based on the usability guidelines using a usability code pattern analysis, which when executed by a processor cause:
receiving an input package from a user device, wherein said input package comprises at least one of (i) layouts that represent data structure of the input package and (ii) class files that are generated after compilation of the input package;
decompiling the input package to extract an input package source code from at least one of the class files and the layouts of the input package;
identifying usability guidelines that the input package requires to comply with based on a domain and a category of the input package from a rule database, wherein the rule database comprises a plurality of usability guidelines;
generating a validation case using a validation case generator in a code format to compare against the input package source code based on the identified usability guidelines;
providing a plurality of constraints and a plurality of variables for the validation case during the generation of the validation case;
providing the plurality of constraints and the plurality of variables of the validation case in a sequence using a workflow invoker for executing validation of the input package source code against the validation case;
executing the validation case against the input package source code based on a workflow by comparing the validation case against the input package source code and generating a validation result by
(a) clearing any previous validated results of previous input packages,
(b) reading the layouts of the input package and selecting suitable attributes in properties section,
(c) comparing the usability code patterns of the usability guidelines that are stored in the code snippet database against the input package source code and providing the validation result (i) as a plurality of success matches, if the usability code patterns of the usability guidelines match with the input package source code (ii) as a plurality of failed matches, if the usability code patterns of the usability guidelines does not match with the input package source code,
(d) suggesting suitable usability code patterns to the input package source code, if the validation result is at least one of the failed matches; and
(e) providing the usability guidelines in detailed results, if the validation result is at least one of the success matches,
wherein the validation result comprises that comprises (i) conformance results of the input package towards the validation case and (ii) evaluated usability guideline's (a) a number (b) a text (c) a description and (d) a category, wherein the validation result is stored in a metric database, wherein the conformance results of the input package towards the validation case comprises at least one of (i) success matches if the usability guidelines match with the input package source code or (ii) failed matches if the usability guidelines does not match with the input package source code;
identifying a usability code pattern for the failed matches of the input package towards the usability guidelines from a code snippet database, wherein the code snippet database comprises a plurality of usability code patterns for the plurality of usability guidelines; and
recommending the usability code pattern to the user device to enable a user to customize the input package source code for the input package.

10. The one or more non-transitory computer-readable storage medium storing the one or more sequence of instructions of claim 9 for generating the validation case, which when executed by a processor further cause,
obtaining the input package from the user device;
selecting the usability guidelines specified in a text format based on the user requirements and the domain and the category of the input package from the rule database;
identifying the usability code pattern related to the usability guidelines and storing the usability code pattern related to the usability guidelines in a code snippet database;
developing the validation case to the identified usability code pattern using the validation case generator; and
storing the validation case which contains a test case to evaluate the input package.

11. The one or more non-transitory computer-readable storage medium storing the one or more sequence of instructions of claim 9 for suggesting the suitable code patterns to the input package source code, which when executed by a processor further cause,
indexing the plurality of usability code patterns that are stored in the code snippet database by dividing the plurality of usability code patterns into a plurality of terms of the plurality of usability code patterns;

storing the plurality of terms in an index file where each term is associated with the plurality of usability code patterns that contain it;

issuing a query of the text of the usability guidelines and processing to build an index and to lookup matching terms in the index; and suggesting the suitable suability code patterns to the input package source code.

12. A system for evaluating and facilitating customized usability source code based on the usability guidelines using a usability code pattern analysis comprising:

a device processor; and a non-transitory computer-readable storage medium storing one or more sequences of instructions, which when executed by the device processor, causes:

receiving an input package from a user device, wherein said input package comprises at least one of (i) layouts that represent data structure of the input package and (ii) class files that are generated after compilation of the input package;

decompiling the input package to extract an input package source code from at least one of the class files and the layouts of the input package;

identifying usability guidelines that the input package requires to comply with based on a domain and a category of the input package from a rule database, wherein the rule database comprises a plurality of usability guidelines;

generating a validation case using a validation case generator in a code format to compare against the input package source code based on the identified usability guidelines;

classifying a plurality of constraints and a plurality of variables of the validation case, from decompiled layouts and decompiled class files of the input package;

providing the plurality of constraints and the plurality of variables of the validation case in a sequence using a workflow invoker for executing validation of the input package source code against the validation case;

executing the validation case against the input package source code based on a workflow by comparing the validation case against the input package source code and generating a validation result by (a) clearing any previous validated results of previous input packages, (b) reading the layouts of the input package and selecting suitable attributes in properties section, (c) comparing the usability code patterns of the usability guidelines that are stored in the code snippet database against the input package source code and providing the validation result (i) as a plurality of success matches, if the usability code patterns of the usability guidelines match with the input package source code (ii) as a plurality of failed matches, if the usability code patterns of the usability guidelines does not match with the input package source code, (d) suggesting suitable usability code patterns to the input package source code, if the validation result is at least one of the failed matches; and (e) providing the usability guidelines in detailed results, if the validation result is at least one of the success matches, wherein the validation result comprises (i) conformance results of the input package towards the validation case and (ii) evaluated usability guideline's (a) a number (b) a text (c) a description and (d) a category, wherein the validation result is stored in a metric database, wherein the conformance results of the input package towards the validation case comprises at least one of (i) success matches if the usability guideline match with the input package source code or (ii) failed matches if the usability guideline does not match with the input package source code;

identifying a usability code pattern for the failed matches of the input package towards the usability guideline from a code snippet database, wherein the code snippet database comprises a plurality of usability code patterns for the plurality of usability guidelines; and recommending the usability code pattern to the user device to enable the user to customize usability guidelines of the input package.

\* \* \* \* \*